(12) United States Patent
Chinnakonda Kubendrachari et al.

(10) Patent No.: US 12,267,214 B2
(45) Date of Patent: Apr. 1, 2025

(54) GUIDANCE TOOL FOR CONFIGURING CLOUD SOLUTIONS

(71) Applicant: Hewlett Packard Enterprise Development LP, Spring, TX (US)

(72) Inventors: Charulekha Shri Chinnakonda Kubendrachari, Bengaluru (IN); Anurag Kumar Gupta, Gaya (IN); Kumar Sharadchandra, Ranchi (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/362,626

(22) Filed: Jul. 31, 2023

(65) Prior Publication Data
US 2025/0047567 A1   Feb. 6, 2025

(51) Int. Cl.
*H04L 41/16* (2022.01)
*H04L 41/22* (2022.01)

(52) U.S. Cl.
CPC .............. *H04L 41/16* (2013.01); *H04L 41/22* (2013.01)

(58) Field of Classification Search
CPC ................................ H04L 41/16; H04L 41/22
See application file for complete search history.

(56) References Cited

U.S. PATENT DOCUMENTS

| | | | | |
|---|---|---|---|---|
| 10,938,674 B1* | 3/2021 | Natanzon | ............ | H04L 41/5096 |
| 11,323,327 B1* | 5/2022 | Chitalia | ................ | H04L 63/102 |
| 11,562,312 B1* | 1/2023 | Fleming | ..................... | G06F 8/60 |
| 11,695,834 B1* | 7/2023 | Aggarwal | ............ | G06Q 10/103 |
| | | | | 709/217 |
| 2012/0304179 A1* | 11/2012 | Devarakonda | ......... | G06Q 10/00 |
| | | | | 718/102 |
| 2014/0278808 A1* | 9/2014 | Iyoob | ................. | G06Q 30/0206 |
| | | | | 705/7.35 |
| 2015/0206207 A1* | 7/2015 | Narasimhan | ........ | H04L 67/1004 |
| | | | | 705/400 |
| 2020/0233397 A1* | 7/2020 | Bello | ................. | G05B 19/4184 |
| 2020/0382592 A1* | 12/2020 | Himura | ................. | H04L 41/147 |

(Continued)

OTHER PUBLICATIONS

LightFM, "Welcome to LightFM's documentation!", available online at <https://making.lyst.com/lightfm/docs/home.html>, 2016, 4 pages.

(Continued)

*Primary Examiner* — Blake J Rubin
(74) *Attorney, Agent, or Firm* — Slater Matsil, LLP

(57) ABSTRACT

In certain embodiments, a method includes receiving, in association with a configuration of a proposed cloud solution, a selection of a first cloud solution aspect made by a user of a guidance tool, and generating, using a hybrid recommender system, a recommendation for a subsequent selection of a second cloud solution aspect of the configuration of the proposed cloud solution. The hybrid recommender system may include a collaborative filtering system and a content-based filtering system, and may generate the recommendation according to information that includes user information, prior configuration information, and the selection. The method further includes providing the recommendation to the user via a user interface of the guidance tool; receiving the subsequent selection; and generating, by the guidance tool, a proposed cloud solution output based at least in part on the selection and the subsequent selection.

22 Claims, 6 Drawing Sheets

(56) References Cited

U.S. PATENT DOCUMENTS

| | | | | |
|---|---|---|---|---|
| 2020/0410418 A1* | 12/2020 | Martynov | ............ | G06F 16/122 |
| 2021/0035112 A1* | 2/2021 | Singh | .................... | G06Q 30/01 |
| 2021/0176191 A1* | 6/2021 | Pargaonkar | ............ | G06Q 10/06 |
| 2021/0216346 A1* | 7/2021 | Mahanta | ................ | G06N 20/00 |
| 2021/0328891 A1* | 10/2021 | Cherkas | ................. | H04L 41/12 |
| 2021/0344559 A1* | 11/2021 | Kabbinale | ........... | H04L 41/0873 |
| 2022/0067747 A1* | 3/2022 | Eisenstein | ............ | G06Q 10/087 |
| 2022/0413932 A1* | 12/2022 | Telang | .................... | G06F 9/505 |
| 2023/0015802 A1* | 1/2023 | Bhattacharya | .......... | G06F 8/658 |
| 2023/0367644 A1* | 11/2023 | Marzorati | ............. | G06F 40/279 |
| 2024/0020641 A1* | 1/2024 | Borowski | .......... | G06Q 10/0875 |

OTHER PUBLICATIONS

Maciej, Kula, "Metadata Embeddings for User and Item Cold-start Recommendations", Jul. 30, 2015, 8 pages.

Tom Fawcett, "An introduction to RO Canalysis", 2006, 14 pages.

Yuanzhe Peng, "A Survey On Modern Recommendation System Based On Big Data", May 31, 2022, 10 pages.

Yuefeng, Zhang, "An Introduction to Matrix factorization and Factorization Machines in Recommendation System, and Beyond", Mar. 12, 2022, 15 pages.

\* cited by examiner

GUIDANCE TOOL FOR CONFIGURING CLOUD SOLUTIONS

BACKGROUND

Entities may seek cloud solutions for performing various activities. One early stage in the process of providing a cloud solution to such an entity includes a presale stage. A presale stage may implicate one or more of numerous entities, including, for example, individuals or entities (e.g., different divisions) within a company offering a solution, partners of the company, channel partners of the company (e.g., distributors, resellers (e.g., value-added or pure), service providers, vendors, retailers, agents, or the like), or other entities. In one example, a presale stage may include determining what an entity seeking a cloud solution wants or needs, and explaining or demonstrating to the entity how one or more products and/or services may allow the entity to achieve the goal reflected by the wants or needs.

BRIEF DESCRIPTION OF THE DRAWINGS

Certain embodiments discussed herein will be described with reference to the accompanying drawings listed below. However, the accompanying drawings illustrate only certain aspects or implementations of embodiments described herein by way of example, and are not meant to limit the scope of the claims.

DETAILED DESCRIPTION

Figure 1:
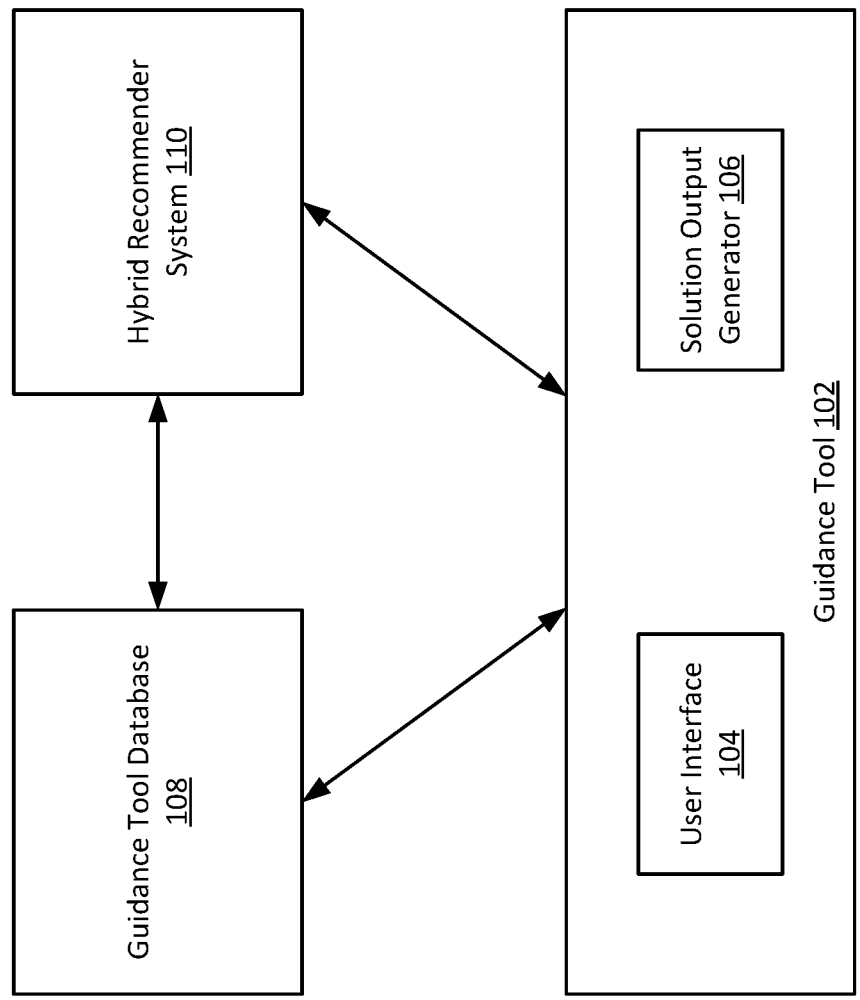
FIG. 1 illustrates a block diagram of an example system for providing guidance and recommendations for configuring a proposed cloud solution, in accordance with one or more embodiments of this disclosure.

Certain embodiments will now be described with reference to the accompanying figures.

In general, embodiments described herein relate to methods, systems, and non-transitory computer readable media storing instructions for implementing a guidance tool for configuring proposed cloud solutions using a hybrid recommender system in accordance with one or more embodiments of this disclosure.

Entities may seek to acquire or otherwise gain access to cloud solutions in order to perform various tasks and activities. A cloud solution may be any collection of computing resources (e.g., processing resources, network resources, storage resources, power resources, software, etc.), related infrastructure, and/or services to be used by and/or provided by a given entity. As an example, any number of entities may share computing resources by being tenants in a cloud computing environment, with the resources used by a given entity being a cloud solution for that entity. As another example, an entity may be, at least in part, a provider of cloud services, to entities outside of the entity, within the entity, or both, with a cloud solution being the computing resources for providing such cloud services. As another example, an entity may be both a consumer and provider of cloud services, with a cloud solution for such an entity combining computing resources deployed by the entity with computing resources to which access is provided by another entity.

A cloud solution may be, for example: a public cloud solution, in which the aforementioned resources are made available as needed or otherwise on demand (e.g., via a computer network, such as the Internet), and may be shared among any number of entities; a private cloud solution, in which the aforementioned resources are deployed by and/or for, and managed, by a particular entity; a hybrid cloud solution, which may combine aspects of both public and private cloud solutions, or any combination thereof. A cloud solution may be implemented within any number of physical locations (e.g., within all or any portion of a particular data center, distributed among multiple locations, etc.).

Entities seeking such a cloud solution may obtain the cloud solution from another entity that provides such resources (e.g., a cloud solution provider). One step in the process of providing a cloud solution is a presale stage. A presale stage may be a stage in the process of providing a cloud solution to an entity during which information is gathered regarding the cloud solution desired by the entity, and a proposed cloud solution capable of meeting that need is generated (e.g., in the form of a Bill of Materials (BOM)).

During the aforementioned presale stage, a user (e.g., a member of a cloud solution presales team) may perform various tasks and actions with a goal of generating a proposed solution, which may, for example, be represented, at least in part, by a BoM. The BoM may include information related to various items, components, etc. needed to implement a proposed cloud solution, such as compute resources, storage resources, network resources, memory resources, power resources, software (e.g., virtual machines, hypervisors, containers, orchestration software, management software, operating systems, applications, etc.), license requirements, etc. that are proposed to meet requirements (e.g., performance requirements, cost requirements, timing requirements, scalability requirements, etc.) of the entity seeking a cloud solution.

The proposed cloud solution may be generated based at least in part on a variety of selections, specifications, etc. provided by the user related to the various computing resources for implementing the proposed cloud solution. However, solutions for generating a proposed cloud solution to satisfy desired wants or needs of an entity seeking a cloud solution lack guidance for the user when the user is making the aforementioned selections, which may, for example, result in over- or under-configuring a proposed solution relative to the requirements.

Certain embodiments of this disclosure attempt to address one or more of these concerns using a guidance tool for generating a proposed cloud solution. The proposed cloud solution (e.g., the BoM) may be generated based at least in part on various selections made by the user, such as a solution type, types and sizes of instances required (e.g., optimized for compute, optimized for memory, configured for accelerated computing, optimized for storage, optimized for high-performance computing, general purpose, etc.), and/or various particular selections related to such instances (e.g., amount of and performance of storage).

The guidance tool may allow a user to make various selections related to a proposed cloud solution. As the user navigates through the tool, all or any portion of the selections made at a given point, and other information related to the user and/or to previously-configured proposed cloud solutions, may be used to provide guidance to the user for making subsequent selections. The guidance may take the form of suggested selections provided to the user within relevant portions of a user interface. The suggested selections may be generated as recommendations from a hybrid recommender system.

A recommender system may be a type of machine learning information filtering system configured to provide relevant suggestions to a user based on data provided as input or otherwise made available to the recommender system. A hybrid recommender system is a recommender system that combines two or more types of machine learning algorithms to provide better recommendations than any one of the algorithms may generate alone. In some embodiments, a hybrid recommender system combines a collaborative filtering machine learning algorithm (e.g., a collaborative filtering system) and a content-based filtering machine learning algorithm (e.g., a content-based filtering system).

A collaborative filtering system may use data, which may, for example, include past behaviors by a user, as well as behaviors of other users in similar situations, to recommend selections to a user based on similarities between users and similarities between items that may be selected. A collaborative filtering system, executed alone, may encounter various problems in certain scenarios. One such scenario is a cold start scenario, in which little or no information is available about a given user and/or other users. Another such scenario is a data sparsity scenario, in which information about a user's preferences and/or the preferences of other users is sparse or lacking.

A content-based filtering system may use information known about a given item (e.g., content and/or metadata related to features of the item), and information related to a given user's implicit preferences (e.g., a user has previously viewed or selected an item) and/or explicit preferences (e.g., a user has previously rated an item on some scale representing the user's value judgment relating to the item) over time. A content-based filtering system, executed alone, may have difficulties when trying to recommend different types of items that have different features (e.g., attributes) than item types about which feedback from the user is known. Combining these two filter system types into a hybrid recommender system may address, at least in part, problems that either may exhibit alone.

As an example, to make a certain recommendation to a user, a hybrid recommender system may filter a dataset using one of the filtering system types, and then apply the second filtering system to the results. As another example, each of the filtering systems may be executed independently, and the results may be combined to generate a recommendation. As another example, each of the filtering systems may be executed independently, and one result may be determined to be preferred over the other, with the preferred result being generated as a recommendation. One of ordinary skill in the art will recognize that hybrid combination techniques different from the aforementioned examples may be used without departing from the scope of embodiments discussed herein.

In various embodiments, a database is maintained that stores information about users and about previously configured proposed cloud solutions. User information may include information about a user (e.g., identifying information, past behavior when using the guidance tool, selections made during a current guidance tool session, etc.). Previously proposed cloud solutions information (which may be referred to herein as prior configuration information) may include information related to the various selections made by users over time when configuring a proposed cloud solution (e.g., solution types, instance types, instance sizes, storage solutions, etc.). The database may be used, at least in part, as the data set on which the hybrid recommender system operates in order to be trained and validated, and thus to generate recommendations to be provided to a user of the guidance tool while the user configures a new proposed cloud solution.

The following is a simple example to illustrate at least some aspects of embodiments described herein. Consider a scenario in which a user seeks to generate a BoM for a proposed cloud solution for a customer seeking to implement a cloud solution.

In such a scenario, the user may obtain various items of information related to a customer's requirements for a desired cloud solution. Based on such information, the user may determine that the customer requires a solution of a particular type (e.g., an enterprise-scale private cloud solution). Therefore, the user may access the guidance tool, and input the solution type. The guidance tool may then be used to navigate through various selections required for the solution, such as instance type desired, instance sizes, storage size and performance, etc.

At each stage, the user, through the guidance tool, is provided with an interface to make the selections. As an example, after specifying a solution type, the user may be asked to input an instance type, such as general-purpose instances, compute optimized instances, etc. The instance type may determine certain characteristics of the instance, such as, for example, the number of processors per instance, the amount of memory per instance, the network bandwidth per instance, the software required for each instance, etc. Instance types may be available in different sizes. As an example, a medium size of an instance type may include relatively less processors, memory, and/or network bandwidth than a larger size of the same instance type.

In one or more embodiments, once the instance type is selected, the user may be asked to select the quantity of instances of various sizes (e.g., four instances of a medium size of the instance type and five instances of a large size of the instance type). In one or more embodiments, the selection of the quantities of the various sizes of the instance type may be referred to as selecting an instance size.

In one or more embodiments, after the instance type and size are selected, the user may be asked to select a storage type and/or size for the solution. As an example, a user may be asked to select from among a high performance or relatively lower performance storage solution, and may select one, the other, or both, as well as the desired storage size for each storage type (e.g., 50 gigabytes, 100 terabytes, etc.).

The user may additionally be asked to provide selections for various other items, such as license types, power distribution infrastructure components, etc. In various embodiments, once the various selections are made by the user, the guidance tool generates a BOM based on the selections. As an example, the BoM may be generated in the form of a javascript object notation (JSON) file specifying the various components of the proposed solution (e.g., processing components, network components, storage components, software, license(s) needed, etc.).

Continuing the example, as the user navigates through the various stages of the guidance tool, for all or any portions of the selections the user is prompted to make, the guidance tool may provide the user with guidance or suggestions (e.g., recommendations) regarding what the user should select. The recommendations may be generated using the aforementioned hybrid recommender system. For any given selection, the hybrid recommender system may use the data in the database regarding the user's past selections, selections made by other users when building similar solutions, and/or previous selections made by the user in the current guidance tool session in order to make the recommendations.

As an example, a user may select an enterprise-scale private cloud solution type. Based at least in part on the specified solution type, the recommender system may recommend that one or more particular instance types be selected for the solution. The user may choose to follow the recommendation, or make a different selection regarding instance type(s).

Next, the hybrid recommender system may provide to the user a recommendation related to the quantities of various instance sizes, which may be based at least in part on the selections the user has made of solution and instance types, as well as what other users have selected in the same or similar scenarios. The user may elect to follow the recommended instance size guidance, or select instance sizes different from the recommendation.

The user may then be prompted to make selections related to storage type and size for the proposed cloud solution. Thus, the hybrid recommender system may provide to the user a recommendation regarding storage types and sizes, based at least in part on the previously selected solution type, instance type, and instance size, as well as what other users have selected for storage after making the same or similar selections in previous steps.

The recommendation process may continue for all or any portion of the selections a user is prompted to make while configuring a proposed solution using the guidance tool. Once all (or at least a portion of) the selections are made, the guidance tool may generate a BoM including the various resources needed for implementing the proposed cloud solution, which may be used to provide the proposal to the customer desiring the cloud solution.

Certain embodiments described herein address potential problems of a user over-, under-, or otherwise mis-configuring a solution relative to a customer's desired requirements due to lack of knowledge while making configuration selections by providing recommended selections from the aforementioned hybrid recommender system at relevant locations in a user interface of a cloud solution configuration guidance tool.

FIG. 1 illustrates a block diagram of an example system 100 for providing guidance and recommendations for configuring a proposed cloud solution, in accordance with one or more embodiments of this disclosure. The system 100 may include a guidance tool 102, a guidance tool database 108, and a hybrid recommender system 110. The guidance tool 102 may include a user interface 104 and a solution output generator 106. Each of these components is described below.

In one or more embodiments, the guidance tool 102 of the system 100 is all or any portion of a computing device. As used herein, a computing device may be any single computing device, a set of computing devices, a portion of one or more computing devices, or any other logical grouping of computing resources. In one or more embodiments, a computing device is any device, portion of a device, or any set of devices capable of electronically processing instructions and may include, but is not limited to, any of the following: one or more processors (e.g. components that include circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre channel storage device, an Internet Small Computer Systems Interface (iSCSI) storage device, a tape storage device, a flash storage array, a network attached storage device, etc.), a network device (e.g., switch, router, multi-layer switch, etc.), a virtual machine, a virtualized computing environment, a logical container (e.g., for one or more applications), an Internet of Things (IoT) device, and/or any other type of computing device with the aforementioned requirements. In one or more embodiments, any or all of the aforementioned examples may be combined to create a system of such devices, which may collectively be referred to as a computing device. Other types of computing devices may be used without departing from the scope of embodiments described herein, such as, for example, the computing device shown in FIG. 6, and described below.

In one or more embodiments, the storage (not shown) and/or memory (not shown) of a computing device or system of computing devices may be and/or include one or more data repositories for storing any number of data structures storing any amount of data (e.g., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) and/or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods, processes, etc. of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

Figure 5:
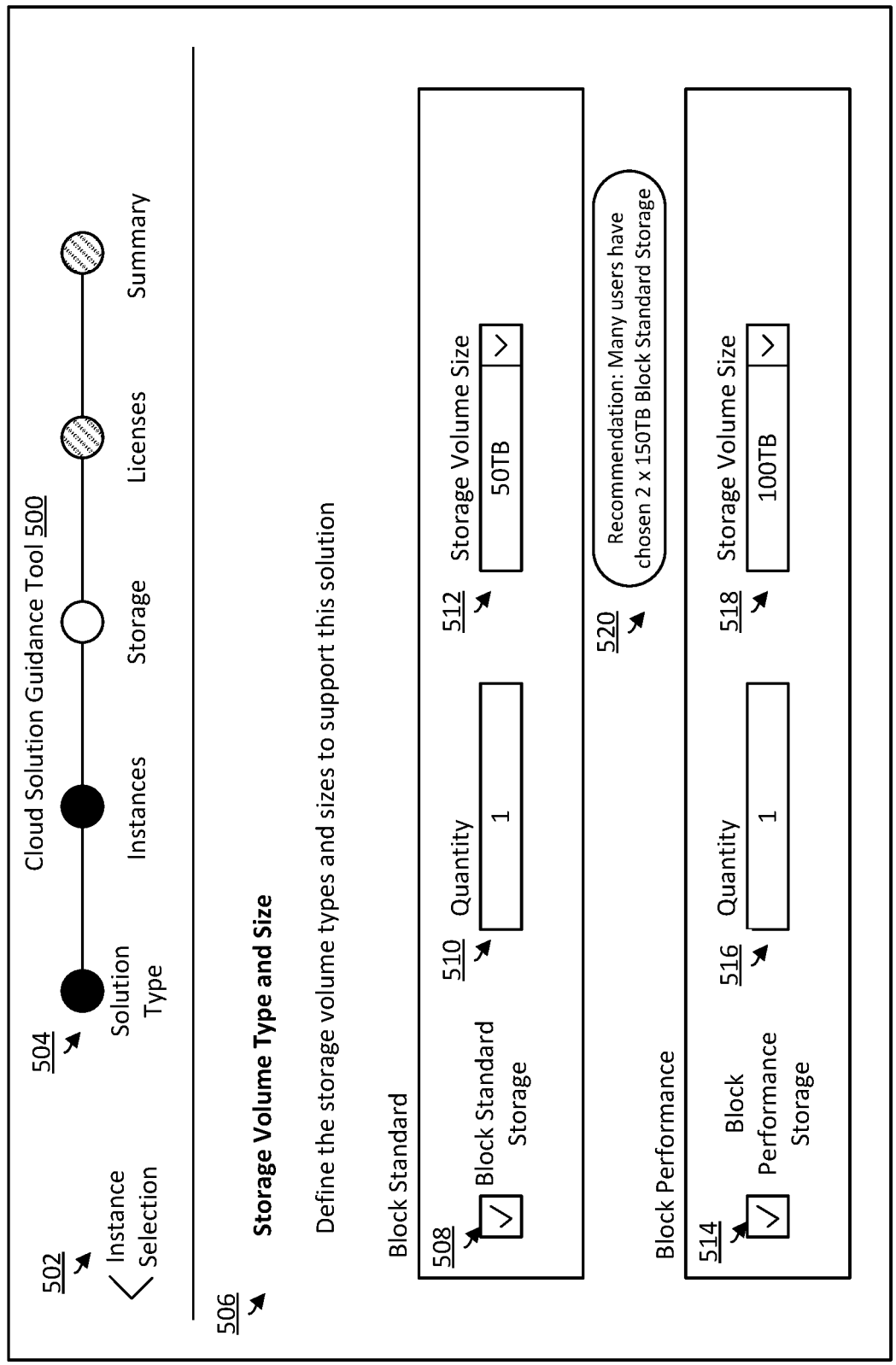
FIG. 5 illustrates an example user interface displaying recommendations during configuration of a proposed cloud solution, in accordance with one or more embodiments of this disclosure.

In one or more embodiments, the guidance tool 102 includes a user interface 104. In one or more embodiments, the user interface 104 is any hardware (e.g., circuitry), software, firmware, or any combination thereof configured to allow a user to interact with a computing device. A user interface may be presented to a user via any output device of a computing device (e.g., a display device), and may be configured to accept input from a user via any input device of a computing device (e.g., a keyboard, a mouse, a touchpad, a microphone, a camera, etc.). As an example, a user interface 104 of the guidance tool 102 may be configured as a series of one or more visual renderings of screens displaying information to a user (e.g., by a suitable output device) and/or soliciting information from a user (e.g., by a suitable input device). An example of a portion of such a user interface is shown in FIG. 5, and discussed further, below.

Information solicited from a user of the guidance tool 102 via the user interface 104 may be in the form of requests for the user to make selections related to aspects of a proposed cloud solution. Such selections may include, but are not limited to, selections of: solution type (e.g., private cloud, public cloud, hybrid cloud, etc.); instance type (e.g., optimized for compute, optimized for memory, configured for accelerated computing, optimized for storage, optimized for high-performance computing, general purpose, etc.); sizes and/or quantities of instance types (e.g., four large size instances of compute-optimized instances and seven instances of general purpose instances), storage intended to accompany the instances (e.g., higher and/or lower performance storage devices, amount of storage, etc.), software required for the solution (e.g., applications, management software, orchestration software, operating systems, hypervisors, etc.), licenses required for the proposed solution (e.g., relevant hardware and/or software licenses); and/or details of particular components for the proposed cloud solution (e.g., particular types of processors, storage, networking, power units, infrastructure components, etc.). A user may be prompted to make selections relevant to configuring a proposed cloud solution via the user interface 104 of the guidance tool 102 using any suitable technique for requesting a user to make a selection. Such techniques include, but are not limited to: manually entering a selection via a keyboard; selecting from a list of possible selections, using a drop-down menu to enter a selection; prompting a user to speak a selection, etc.

As an example, the user interface 104 may present to a user a series of visually rendered screens via a display device included in or otherwise operatively connected to the guidance tool 102. Each such screen may present certain items of information to a user, while also soliciting input for certain other items of information from the user. Such information may be input by the user in any suitable form, such as, for example, typing or speaking a certain selection, selecting a selection from a list of possibilities (e.g., via a drop-down list), etc. For all or any portion of the instances of the user interface soliciting information, the user interface 104 may also display a recommendation to the user related to what the user should choose as a selection.

For example, a user that has selected, on a previous screen, a certain type of solution (e.g., a private cloud solution) may be provided, via the user interface 104, a field in which to input a selection of a type of instance (e.g., general purpose, compute-optimized, memory optimized, etc.) to be used to implement the proposed solution type. In such a scenario, the user may additionally be provided with a recommendation related to what selection a user should input into the field. Such a recommendation may, for example, be presented to the user in proximity to the field into which the user input is solicited (e.g., a pop-up dialogue element that provides the relevant suggestion). Such recommendations may, for example, be generated by and obtained from the hybrid recommender system 110, which is discussed further, below.

In one or more embodiments, the guidance tool 102 includes a solution output generator 106. In one or more embodiments, the solution output generator 106 is any hardware (e.g., circuitry), software, firmware, or any combination thereof configured to generate a solution output. In one or more embodiments, a solution output is an output from a computing device (e.g., the guidance tool 102) of information in any form that includes all or any portion of a set of details relevant to a proposed cloud solution. A solution output generator may be configured to use all or any portion of user input provided by a user via the user interface 104, and/or from any other information source, to generate a proposed cloud solution as a solution output.

As an example, the solution output generator 106 may use various user inputs, such as proposed solution type, instance types for implementing the proposed solution type, sizes of such instances, other requirements of a proposed cloud solution (e.g., storage performance type, storage size, etc.), software required, licenses required, power components, etc., to generate a set of computing resources (e.g., processors, network resources, storage resources, software, power-providing devices, related infrastructure, software, licenses, etc.) that make up a proposed cloud solution. One example of a solution output is a BoM (e.g., in the form of a JSON file), which includes such details of a proposed cloud solution, and may include other items of information, including quantities of items, cost of items, aggregate cost of all or any portion of the items, possible alternatives to all or any portion of the items, materials related to how to assemble or use the items specified in the BoM, etc. A solution output generated by the solution output generator 106 may be in any other suitable form without departing from the scope of embodiments described herein.

In one or more embodiments, the system 100 includes a guidance tool database 108. In one or more embodiments, the guidance tool database 108 includes any form of data storage for storing any type of information. The guidance tool database 108 may be included in and/or otherwise operatively connected to the guidance tool 102 (discussed above) and/or to the hybrid recommender system 110 (discussed below). The guidance tool database may be implemented, at least in part, using a computing device (described above). In one or more embodiments, the guidance tool database 108 may be stored in any suitable form and in any type of data storage device. Such data storage may be referred to as a data repository. In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, the guidance tool database 108 includes both user information and prior configuration information.

In one or more embodiments, user information is information related to any user that has previously and/or is currently in the process of configuring a proposed cloud solution using the guidance tool 102 and/or any other technique for configuring a proposed cloud solution (e.g., some other tool, manual configuration, etc.). User information may include, but is not limited to, details related to users of the guidance tool 102 (e.g., user names, user locations, past user behavior while using the guidance tool, user preferences, previous selections made during a current session of a particular user using the guidance tool, etc.).

Prior configuration information may include any information related to previously configured proposed cloud solutions. Such prior configuration information may be obtained from the guidance tool 102 each time a new proposed cloud solution is configured, and/or may be obtained from any other source that includes proposed cloud solution configurations (e.g., other tools, manually configured proposed cloud solutions, etc.). Such information may be aggregated in the guidance tool database 108 to form the prior configuration information. Prior configuration information may include, but is not limited to, information about a user that configured a particular proposed cloud solution, details about the previously configured proposed cloud solution such as, for example, solution type(s), instance type(s), instance size(s), particular information about cloud solution aspects (e.g., processor details, network details, storage details, software details, license details, required infrastructure, etc.).

The guidance tool database 108 may be organized in any suitable manner of organizing information. As an example, the guidance tool database 108 may include a collection of one or more tables that associate users and user information with prior configuration information, and may include any other associations between items of information included in the guidance tool database 108.

The system 100 may include a hybrid recommender system 110. In one or more embodiments, the hybrid recommender system 110 is operatively connected to the guidance tool database 108 and to the guidance tool 102. In one or more embodiments, the hybrid recommender system 110 is any hardware (e.g., circuitry), software, firmware, or any combination thereof that is configured to implement a hybrid recommender for recommending selections to a user of the guidance tool 102. In one or more embodiments, all or any portion of the hybrid recommender system 110 may be implemented, at least in part, using a programming language library, such as, for example, the LightFM python library. The hybrid recommender system 110 may be trained and validated using information from the guidance tool database 108 to obtain a trained hybrid recommender system. The trained hybrid recommender system may then be used to generate recommendations for a user related to selections the user is prompted to make while using the guidance tool 102.

The hybrid recommender system 110 may combine any number of different machine learning techniques, such as, for example, collaborative filtering, content-based filtering, etc. In one or more embodiments, as a user navigates through the guidance tool 102, details about the user, and any selections made using the guidance tool 102 in the current session, may be provided to the hybrid recommender system 110 in real-time as input, thereby allowing the trained hybrid recommender system to generate recommendations for selections to be made by the user.

In one or more embodiments, recommendations generated by the hybrid recommender system 110 are provided to the guidance tool 102 to be displayed to a user via the user interface 104. In one or more embodiments, the hybrid recommender system 110 is re-trained from time to time to obtain an updated trained hybrid recommender system. Such training may be performed, at least in part, to incorporate details related to proposed cloud solutions configured since the last training of the hybrid recommender system. Such re-training may be performed pursuant to any schedule, such as, for example, based on a certain amount of time passing, based on a certain amount of information being added to the guidance tool database related to proposed cloud solutions and/or users, etc. Additional details related to the hybrid recommender system 110 are discussed below in the description of FIG. 2.

In one or more embodiments, the guidance tool 102, the guidance tool database 108, and the hybrid recommender system 110 are operatively connected to one another using any suitable form of connection that allows information to be exchanged. As an example, one or more of the aforementioned components of the system 100 may be connected to any other of the components via a network (not shown). A network may refer to an entire network or any portion thereof (e.g., a logical portion of the devices within a topology of devices). A network may include a datacenter network, a wide area network, a local area network, a wireless network, a cellular phone network, and/or any other suitable network that facilitates the exchange of information from one part of the network to another. A network may be located at a single physical location, or be distributed at any number of physical sites. In one or more embodiments, a network may be coupled with or overlap with, at least in part, the Internet.

While FIG. 1 shows a particular configuration of components, other configurations may be used without departing from the scope of embodiments described herein. For example, although FIG. 1 shows certain components as part of the same device, any of the components may be grouped in sets of one or more components which may exist and execute as part of any number of separate and operatively connected devices. As another example, a single component may be configured to perform all or any portion of the functionality performed by the components shown in FIG. 1. For example, the guidance tool and the hybrid recommender system may be part of the same computing device. Accordingly, embodiments disclosed herein should not be limited to the configuration of components shown in FIG. 1.

Figure 2:
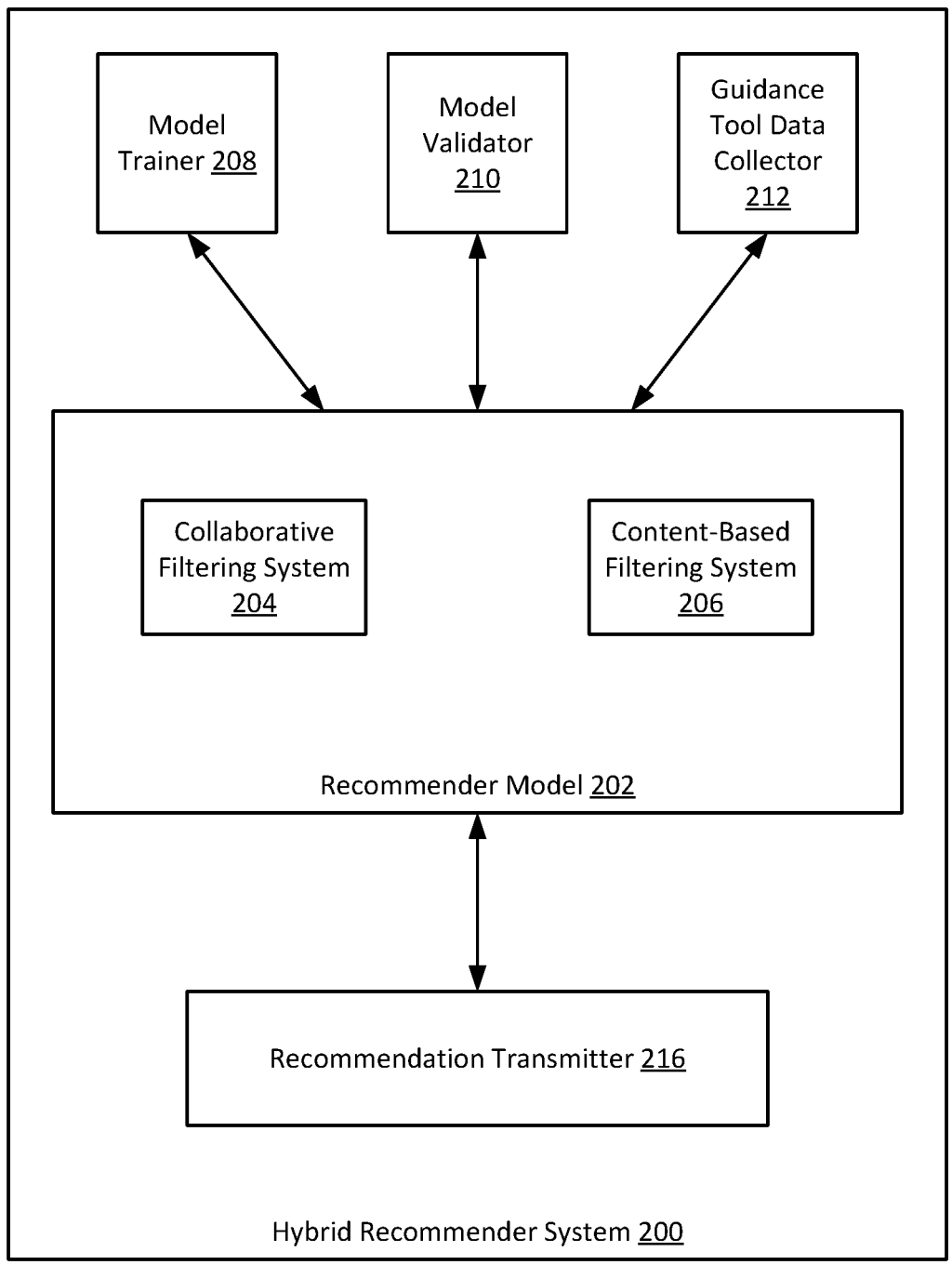
FIG. 2 illustrates a block diagram of a hybrid recommender system, in accordance with one or more embodiments of this disclosure.

FIG. 2 illustrates a block diagram of a hybrid recommender system 200, in accordance with one or more embodiments of this disclosure. As shown in FIG. 2, the hybrid recommender system 200 may include a model trainer 208, a model validator 210, a guidance tool data collector 212, a recommendation transmitter 216, and a recommender model 202. The recommender model 202 may include a collaborative filtering system and a content-based filtering system. Each of these components is described below.

The hybrid recommender system 200 may be the same as or substantially similar to the hybrid recommender system 110 shown in FIG. 1 and discussed above. As such, for example, the hybrid recommender system may be implemented using a computing device.

In one or more embodiments, the hybrid recommender system 200 includes a recommender model 202. The recommender model may be any hardware (e.g., circuitry), software, firmware, or any combination thereof that is configured to execute one or more machine learning algorithms to generate a recommendation for a particular aspect of a proposed cloud computing solution. As used herein, an aspect of a proposed cloud computing solution refers to any particular detail of a proposed cloud computing solution that a user of a guidance tool (e.g., the guidance tool 102 of FIG. 1) may be prompted to input while configuring a proposed cloud solution such as, for example, solution type, instance type(s), instance sizes, storage type, storage size, or any other detail related to a configuration of a cloud solution.

The recommender model 202 may be configured to accept inputs related to user information and prior configuration information, as well as selections made during a current session of a guidance tool for configuring a proposed cloud solution (which may be a portion of user information), to generate as output one or more recommendations regarding what a user should enter as input for a particular selection of an aspect of the proposed cloud computing solution. The recommender model 202 may execute any number of machine learning algorithms, such as, for example, the collaborative filtering system 204 and the content-based filtering system 206 shown in FIG. 2 and discussed further below.

In one or more embodiments, the recommender model 202 includes a collaborative filtering system 204. The collaborative filtering system 204 may be any hardware (e.g., circuitry), software, firmware, or any combination thereof that is configured to be trained based on inputs of information related to users and features related to possible aspects of a proposed cloud solution to generate recommendations regarding what a current user of a guidance tool should select when selecting an aspect of a proposed cloud solution. In one or more embodiments, the collaborative filtering system may implement a collaborative filtering machine learning model. Such a machine learning model may use similarities between users of the guidance tool (past and present), as well as similarities between proposed cloud solution aspects, to generate recommendations. Described another way, a collaborative filtering model may consider the similarity of cloud solutions attribute when making predictions (filtering) about the interests of a user and closeness in the behavior of similar customers (e.g., collaborating).

As a simple example, users may express explicit or implicit feedback for particular cloud solution aspects. An aggregate set of such feedback may be used to train and validate the collaborative filtering system so that when a new user uses the guidance tool, information related to the user (e.g., past behaviors and preferences), as well as feedback from other users that was used to train the model, causes the model to output a recommendation to be provided to a user via a user interface of a guidance tool when the user is considering making a selection of a particular cloud solution aspect.

In one or more embodiments, the recommender model 202 includes a content-based filtering system 206. A content-based filtering system may be any hardware (e.g., circuitry), software, firmware, or any combination thereof that is configured to be trained based on inputs of information related a current user and features related to aspects of a proposed cloud solution to generate recommendations regarding what a current user of a guidance tool should select when selecting an aspect of a proposed cloud solution. In one or more embodiments, the content-based filtering system may use features of particular cloud solution aspects to recommend other aspects that are similar to what the user has preferred in the past, based on, for example, implicit feedback such as user actions (e.g., selecting a particular cloud solution aspect) or explicit user feedback (e.g., explicitly expressing a preference for a certain aspect type or aspect feature). Described another way, a content-based filtering model may be based on the attributes of possible selection choices and the user's preferences regarding such choices based on past inputs to a guidance tool, which may, for example, be based at least in part on the user's preferences for how to configure a cloud solution to meet the requirements of an entity seeking a cloud solution.

As a simple example, a content-based model may use a user's past preference for storage having a particular performance when generating a storage type recommendation to be presented to the user during a current session of the user using a guidance tool.

In one or more embodiments, the hybrid recommender system 200 includes a model trainer 208. In one or more embodiments, a model trainer 208 is any hardware (e.g., circuitry), software, firmware, or any combination thereof that is configured to train one or more machine learning models. In one or more embodiments, the model trainer obtains training data from a guidance tool database (e.g., the guidance tool database 108 shown in FIG. 1 and described above). Training data may refer to at least a portion of any user data and prior configuration data added to a guidance tool database before a current session of a user using a guidance tool (e.g., the guidance tool 102 shown in FIG. 1 and discussed above) to configure a proposed cloud solution.

The model trainer 208 may prepare the training data for training a machine learning model. Additionally or alternatively, training data may be prepared separately (e.g., by a data preparation component (not shown)), and provided to the model trainer 208. In one or more embodiments, preparing data for training one or more machine learning models may include obtaining data from a guidance tool database, and transforming the data into a form relevant to a particular machine learning model.

As an example, for training a collaborative filtering system (e.g., the collaborative filtering system 204), data may be prepared by using user data and prior configuration data from a guidance tool database to generate a matrix of users (e.g., as matrix rows) and proposed cloud solution aspects (e.g., as matrix columns). Such a matrix may include as entries values related to implicit or explicit feedback of a given user for a given cloud solution aspect. As an example, the fact that a given user selected a particular amount of storage for a proposed cloud solution may be represented by a value indicating a positive feedback for that amount of storage for the user.

As another example, for training a content-based filtering system, data may be prepared by organizing the data into a matrix representing users and features of cloud solution aspects, with entries of the matrix including values that indicates the user's strength of preference or not for the features.

For performing training of the recommender model 202, training performed by the model trainer 208 may include preparing the data based on how the collaborative filtering system 204 and the content-based filtering system 206 are to be combined to generate output recommendations for cloud solution aspects. Combination techniques may include, but are not limited to: combining the data for training both models as a combination, training the two models separately and combining the results, training the two models separately and using predetermined criteria to select one result over the other result, etc. As such, data from the guidance tool database may be prepared to form a single matrix, a set of matrices for the respective models, etc.

In one or more embodiments, the model trainer 208 trains the recommender model 202 and the filtering systems therein (e.g., the collaborative filtering system 204 and the content-based filtering system 206), by using the one or more input matrices of data to generate recommendation outputs, and parameters of the model are adjusted until the actual output recommendations match expected output recommendations, at least within a certain degree of acceptable error. Such parameters may include embeddings for the one or more matrices. A matrix may be associated with any number of embeddings related to features of the cloud solution aspects and/or the users. An embedding may be, for example, a numerical representation of the strength of a relationship between a user or a cloud solution aspect to a given feature of the aspect. Any type of embedding technique may be used without departing from the scope of embodiments discussed herein (e.g., matrix factorization).

In one or more embodiments, the hybrid recommender system 200 includes a model validator 210. A model validator 210 may be any hardware (e.g., circuitry), software, firmware, or any combination thereof that is configured to validate the degree to which a trained machine learning model is capable of outputting accurate results. To that end, the model validator 210 may obtain or otherwise be provided with test data. In one or more embodiments, test data is a subset of the data from the guidance tool database that has, prior to validation, not been provided to the recommender model 202. Test data may be prepared in a manner similar to the preparation of training data, and may be used to input data to the recommender model to assess whether the recommender model outputs recommendations that match the expected output recommendations within a predetermined degree of error. In one or more embodiments, to test a trained recommender model, various techniques may be used to determine how well the model is trained, including, but not limited to, weighting the matric factorization, and applying an optimization technique, such as, for example, Weighted Alternating Least Squares, Stochastic Gradient Descent, Weighted Approximate Rank Pairwise, etc. In one or more embodiments, once the model validator 210 determines that an instance of the recommender model 202 is producing outputs of sufficient accuracy, the recommender model 202 may be considered to be a trained recommender model.

In one or more embodiments, the hybrid recommender system 200 includes a guidance tool data collector 212. The guidance tool data collector 212 may be any hardware (e.g., circuitry), software, firmware, or any combination thereof that is configured to obtain data to be provided as input to a trained recommender model for generating output recommendations to be provided to a user of a guidance tool. In one or more embodiments, the guidance tool data collector may be configured to obtain information about a current user of the guidance tool, as well as information about the current session of the user using the guidance tool, such as, for example, where the user is in the tool (e.g., what step of the proposed cloud solution configuration process), what selections the user has previously made during the current session, how long the user has been using the guidance tool, how long the user has been on a given step, the location of a cursor of the user within a particular user interface screen, etc. At least a portion of such information may be used to determine when to execute the trained recommender model, and what information to provide to the trained recommender model, to cause the trained recommender model to generate a recommended selection for a particular aspect of a proposed cloud solution configuration.

All or any portion of the information obtained by the guidance tool data collector 212 may be obtained from a guidance tool database (e.g., the guidance tool database 108 shown in FIG. 1 and discussed above) and/or directly from the guidance tool. In one or more embodiments, the data to be provided as input to the trained recommender model 202 may be obtained in real-time as a user uses the guidance tool to configure a proposed cloud solution, so that the recommendations generated by the trained hybrid recommender system may be provided to the user in real-time as the user navigates through the various portions of the guidance tool.

In one or more embodiments, the recommender model 202 may be re-trained from time to time. As an example, the recommender model may be re-trained on a defined schedule, after a certain amount of new user data and/or prior configuration data has been added to the guidance tool database, upon training being initiated manually, etc. In one or more embodiments, re-training includes performing training and validation of the recommender model using new user and prior configuration data obtained from users using the guidance tool to configure proposed cloud solutions.

In one or more embodiments, the hybrid recommender system 200 includes a recommendation transmitter 216. In one or more embodiments, the recommendation transmitter 216 is any hardware (e.g., circuitry), software, firmware, or any combination thereof that is configured to obtain one or more recommendations for cloud solution aspects from the trained recommender model 202, and to transmit or otherwise provide the one or more recommendations to a guidance tool (e.g., the guidance tool 102 shown in FIG. 1). The recommendation may be transmitted using any suitable form of sending information such as, for example, over a network.

While FIG. 2 shows a configuration of components, other configurations may be used without departing from the scope of embodiments described herein. For example, although FIG. 2 shows all components as part of the same device, any of the components may be grouped in sets of one or more components which may exist and execute as part of any number of separate and operatively connected devices. As another example, a single component may be configured to perform all or any portion of the functionality performed by the components shown in FIG. 2. Accordingly, embodiments disclosed herein should not be limited to the configuration of components shown in FIG. 2.

Figure 3:
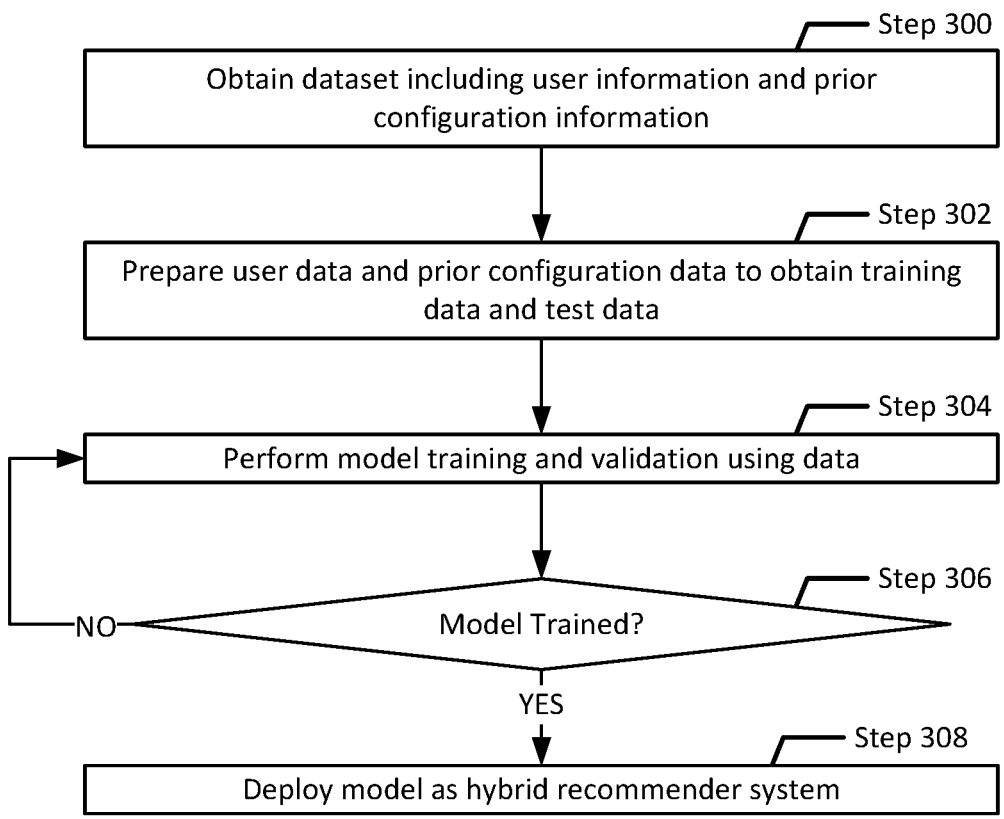
FIG. 3 illustrates an overview of an example process for preparing a hybrid recommender system for providing guidance and recommendations for configuring a proposed cloud solution, in accordance with one or more embodiments of this disclosure.
Figure 4:
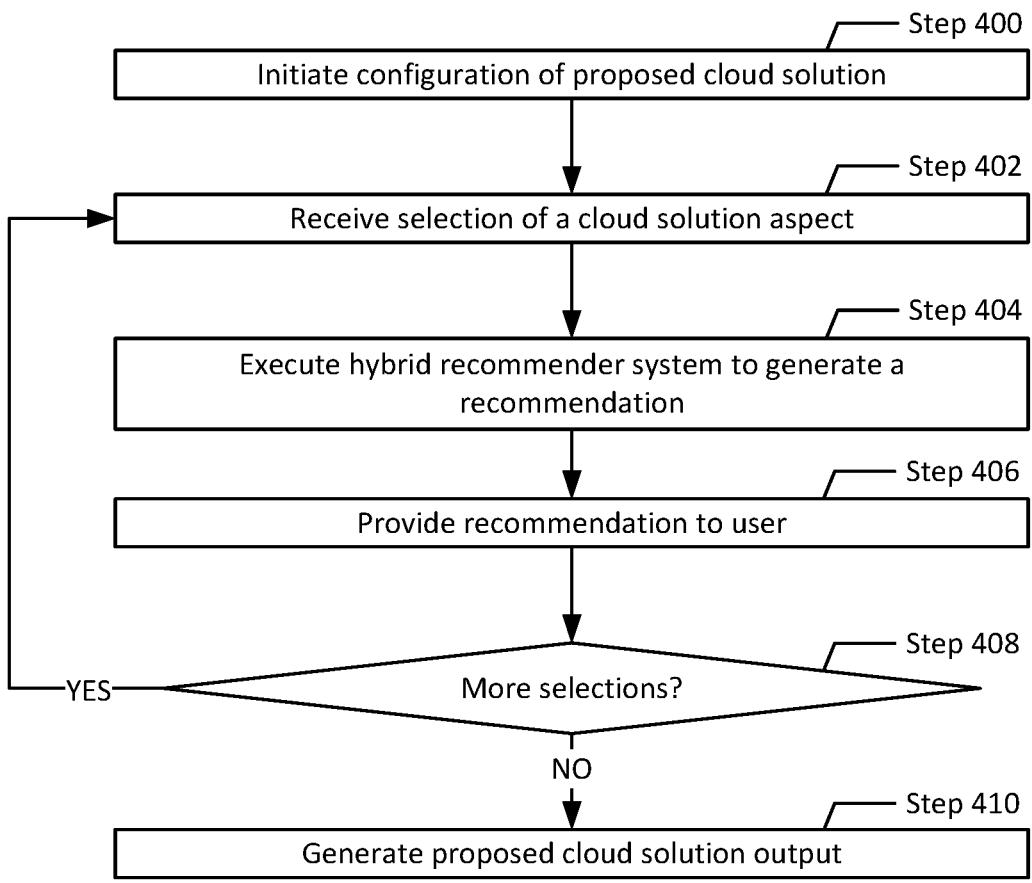
FIG. 4 illustrates an overview of an example process for providing guidance and recommendations for configuring a proposed cloud solution, in accordance with one or more embodiments of this disclosure.

FIG. 3 illustrates an overview of an example process for preparing a hybrid recommender system (e.g., the hybrid recommender system 110 shown in FIG. 1; the hybrid recommender system 200 shown in FIG. 2) for providing guidance and recommendations for configuring a proposed cloud solution, in accordance with one or more embodiments of this disclosure While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel with other steps of FIG. 3 and/or FIG. 4.

In Step 300, the method includes obtaining a dataset including user information and prior configuration information. As discussed above, user data may be any data related to a user of a guidance tool and/or to any user that has previously configured a proposed cloud solution (e.g., during a presale stage of a cloud solution proposal process), and prior configuration information may be any information related to proposed cloud solution configurations configured by such users. In one or more embodiments, the dataset is obtained, at least in part, from a guidance tool database (e.g., the guidance tool database 108 shown in FIG. 1) by a hybrid recommender system (e.g., the hybrid recommender system 110 shown in FIG. 1, the hybrid recommender system 200 shown in FIG. 2). In one or more embodiments, the data is obtained by a model trainer (e.g., the model trainer 208 shown in FIG. 2) of a hybrid recommender system.

In Step 302, the method includes preparing the dataset to obtain training data and test data. As discussed above, training data is at least a portion of the user information and prior configuration information to be used for training a recommender model (e.g., the recommender model 202 of FIG. 2) of the hybrid recommender system, and test data is another portion of the same data to be used for validating the trained recommender model. In one or more embodiments, preparing the data includes putting the data into a format that may be used as inputs for the recommender system, such as one or more matrices representing information about users and/or about features (e.g., types, sizes, etc.) of aspects of a proposed cloud solution (e.g., solution types, instances, storage, etc.).

In Step 304, the method includes performing model training and validation using the training data and test data obtained in Step 302. In one or more embodiments, the training is performed, at least in part, by a model trainer (e.g., the model trainer 208 of FIG. 2) of a hybrid recommender system., and model validation is performed, at least in part, by a model validator (e.g., the model validator 210 of FIG. 2). In one or more embodiments, training the model includes executing the model any number of times using the training data, and validating the results of the trained model using the test data. During each iteration of execution of the model, various aspects of the model (e.g., various embeddings) may be adjusted to alter the output results generated by the model. In one or more embodiments, the model is considered trained once the output recommendations match expected output recommendations within a predetermined level of acceptable error.

In Step 306, the method includes making a determination as to whether the model is sufficiently trained. Any suitable technique for evaluating the performance of the hybrid recommender system may be used without departing from the scope of embodiments disclosed herein. As an example, the performance of the hybrid recommender system may be evaluated by determining the area under curve (AUC) of a receiver operating curve (ROC), which may be referred to as a ROC AUC score. In one or more embodiments, the AUC for the ROC is a metric which predicts the probability that a random positive sample has higher score than a random negative sample. The value of AUC may range from zero to one. If the AUC score is 0, then the prediction is entirely incorrect and if the score is one, then the prediction is entirely correct. Accordingly, the closer the metric is to one, the better the recommendations the hybrid recommender system is making are. In one or more embodiments, an acceptable level for the ROC AUC score is pre-determined (e.g., 90%), and when the hybrid recommender system is calculated to have a ROC AUC score above that level, the hybrid recommender system may be considered sufficiently trained. In one or more embodiments, when the hybrid recommender system is determined to not yet be sufficiently trained, the method may return to Step 304 to continue training. In one or more embodiments, when the hybrid recommender system is determined to be sufficiently trained, the method continues to Step 308.

In Step 308, the method includes deploying the hybrid recommender system for making recommendations to users of a guidance tool in real-time as the user interacts with the guidance tool to configure a proposed cloud solution. In one or more embodiments, deploying the hybrid recommender system includes putting the hybrid recommender system in a state of readiness to accept input from the guidance tool in order to generate recommendations for various aspects of a proposed cloud solution being configured by a user of the guidance tool.

FIG. 4 illustrates an overview of an example process for providing guidance and recommendations for configuring a proposed cloud solution, in accordance with one or more embodiments of this disclosure. In one or more embodiments, the process is implemented, at least in part by a hybrid recommender system (e.g., the hybrid recommender system 110 shown in FIG. 1; the hybrid recommender system 200 shown in FIG. 2) to provide recommendations for selection choices encountered by a user of a guidance tool during configuration of a proposed cloud solution in accordance with one or more embodiments disclosed herein.

While the various steps in the flowchart shown in FIG. 4 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel with other steps of FIG. 3 and/or FIG. 4.

In Step 400, the method includes initiating a configuration of a proposed cloud solution. Initiating a configuration of a proposed cloud solution may result from a user accessing a guidance tool to begin configuring a proposed cloud solution for an entity seeking a cloud solution. Initiating a configuration of a proposed cloud solution may also include putting a hybrid recommender system into a state in which it is ready to accept information from the guidance tool, such as information about the user (e.g., identifying information, location information, past user behavior, etc.), information about the particular instance of the guidance tool being used (e.g., information allowing the hybrid recommender tool to communicate with the guidance tool to provide recommendations), and/or information about selections made by the user during the current guidance tool session (e.g., the actual selections made by the user of one or more proposed cloud solution aspects). In one or more embodiments, initiating configuration of a proposed cloud solution includes generating and providing to a user of a guidance tool a recommendation related to a first (e.g., initial) aspect of a proposed cloud solution. As an example, if the user has previously configured one or more proposed cloud solutions, then the user may already exist in the guidance tool database, and the user's previous behaviors, preferences, etc. when using the guidance tool (e.g., user information), along with information about previous proposed cloud solutions (e.g., prior configuration information) configured by similar users may be used by the hybrid recommender system to generate a recommendation for the initial aspect of the proposed cloud solution. As another example, if the user of the guidance tool is a new user, the hybrid recommender system may generate a recommendation based on initial selections made by previous users of the guidance tool (e.g., "Most users select to configure an enterprise private cloud solution type").

In Step 402, the method includes receiving a selection of a cloud solution aspect. In one or more embodiments, the selection is received by a hybrid recommender system from a guidance tool being used by a user to configure a proposed cloud solution. In one or more embodiments, a selection of a cloud solution aspect is any selection made by the user of the guidance tool during a configuration of a proposed cloud solution. If the user is at the beginning of the configuration process, for example, the guidance tool may prompt the user to select a solution type (e.g., enterprise-scale private cloud). After making the initial selection, the user may be guided through the configuration process by the guidance tool. As an example, after making a first selection, the user may be prompted to make any number of subsequent selections regarding various aspects of a proposed cloud solution, such as, for example, types of instances, instance sizes, storage types, storage sizes, licenses needed, power equipment needed, etc. Each such selection may be provided from the guidance tool to the hybrid recommender system, which may incorporate the one or more selections as additional input for generating recommendations for the user for subsequent selections to be made via the guidance tool.

In Step 404, the method includes executing the hybrid recommender system to generate a recommendation for an aspect of a proposed cloud solution. In one or more embodiments, executing the hybrid recommender system includes using user information, prior configuration information, and any selections made by a user during the current session of the guidance tool. User information may include any information related to a user, including, but not limited to, identifying information, location information, information about past user behavior when using he guidance tool, etc. Prior configuration information may be any information about previously configured proposed cloud solutions (e.g., proposed cloud solutions configured by prior users of the guidance tool). Selections made by the user during the current session of the guidance tool may include all or any portion of any selections made by the user via the guidance tool while configuring a proposed cloud solution.

In one or more embodiments, the aforementioned information may be used as at least a portion of the input to the hybrid recommender system being used to generate a recommendation, which may use the input information to generate a recommendation for a cloud solution aspect. A recommendation may be in any suitable form for conveying information. As an example, a recommendation may take the form of text to be presented as a suggestion to the user in real-time when the user is viewing a portion of the user interface of the guidance tool in which the user is prompted to make a selection of an aspect of a cloud solution. As an example, a user may have already selected a solution type, and is currently viewing a screen of the user interface in which the user is asked to select an instance type (e.g., general purpose, compute-optimized, etc.). In such a scenario, the hybrid recommender system may be executed using user information, prior configuration information, and the user's previous selection of a solution type to generate a recommendation for the user regarding what type of instance to select (e.g., "Most users configuring a private enterprise cloud select a general-purpose instance type").

In Step 406, the method includes providing the recommendation generated in Step 404 to the user of the guidance tool. In one or more embodiments, the recommendation is provided via a user interface of the guidance tool. As an example, a user may be at a point in a configuration of a proposed cloud solution in which the user is viewing a user interface screen that is prompting the user to select a type of storage (e.g., block storage, high-performance storage), as well as an amount of storage. In such a scenario, the hybrid recommender system may generate a recommendation that includes text stating that "Most users have chosen 2×150 TB Block Storage". The recommendation may be provided to the user, for example, as a pop-up dialogue bubble that appears in the guidance tool user interface screen near the location where the user is being asked to make a selection of storage type and size.

In Step 408, a determination is made as to whether there are any more selections to be made by the user of the guidance tool for configuring a proposed cloud solution. In one or more embodiments, if additional selections are to be made, then the method returns to Step 402, and the hybrid recommender system may continue to receive selections made by the user and continue to generate recommendations for subsequent selections to be made by the user. In one or more embodiments, when there are no remaining selections to be made, the method may proceed to Step 410.

In Step 410, the method includes generating a proposed cloud solution output. In one or more embodiments, a proposed cloud solution output includes information in any form that conveys details related to a proposed cloud solution configured by a user of a guidance tool. As an example, the proposed cloud solution may be displayed to or otherwise made available to the user (e.g., via download, email, etc.) the user as a Bill of Materials (BOM), which may include details related to the various aspects of the proposed cloud solution, such as compute resources, networking resources, storage resources, power resources, software resources, licenses, etc. that are needed to implement the proposed cloud solution. The user may then use the BoM to continue the process of providing a cloud solution to an entity seeking the same. As an example, the user may edit the BoM, if necessary. When the BoM is finalized, the user may then proceed to obtain pricing information based on the BoM, and present the proposed cloud solution to the entity seeking the cloud solution.

FIG. 5 illustrates an example user interface displaying recommendations during configuration of a proposed cloud solution, in accordance with one or more embodiments of this disclosure. The example shown in FIG. 5 and discussed below is a simplified example intended for explanatory purposes only, and not intended to limit the scope of embodiments described herein. Additionally, while the example shows certain aspects of embodiments described herein, all possible aspects of such embodiments may not be illustrated in this particular example.

Consider a scenario in which a presales team member (e.g., a user) wants to configure a proposed cloud solution for a customer seeking the same. The presales team member may interact with the customer to determine various parameters, requirements, etc. that the customer desires for the cloud solution. After this interaction, the presales team member accesses a guidance tool for configuring a proposed cloud solution. The presales team member interacts with the guidance tool via a user interface. One screen of the user interface is shown in FIG. 5, which shows a user interface screen of a Cloud Solution Guidance Tool 500.

In this scenario, the user has accessed the Cloud Solution Guidance Tool 500, and made several selections. Specifically, prior to reaching the screen shown in FIG. 5, the presales team member has selected a solution type of Private Cloud Enterprise. After making the selection of solution type, the user selected compute optimized instances for the instance type, and selected four medium size, two large size, and two extra large size instances of the selected instance type.

Element 502 of the Cloud Solution Guidance Tool 500 screen is a navigation button, which the presales team member may select at any time to return to the previous screen of the user interface, which in this scenario is the screen where the presales team member makes selections related to the instances for the proposed cloud solution. Cloud Solution Guidance Tool 500 screen shown in FIG. 5 includes a progress bar 504. As shown in FIG. 5, the user has already selected a solution type and made selections related to instances, which is represented by the colored circles for those steps. The progress bar 504 also shows, via an empty circle, that the presales team member is currently at the stage of making selections related to storage for the proposed cloud solution. The progress bar 504 also shows, via circles with lines inside, that the user has not yet reached the point of making selections related to licenses, or to see a summary of the proposed cloud solution, which the Cloud Solution Guidance Tool will generate at the end of the configuration process.

Cloud Solution Guidance Tool 500 includes a selection area 506, which is an area of the user interface in which the presales team member is prompted to make selections related to storage. Specifically, the presales team member may use the check boxes 508 and 514 to select either block standard storage, block performance storage, both, or neither, depending on which boxes are checked. Elements 510 and 516 of the selection area 506 are boxes in which the presales team member can enter the quantity of volumes for each storage volume type. Elements 512 and 518 of the selection area 506 are where the presales team member can select the sizes of each storage type, which may be selected from a drop-down list accessed by interacting with the down facing arrow on the right side of the boxes.

In this scenario, a hybrid recommender system (not shown) has been previously trained using data from a guidance tool database (not shown) that includes the following information:

TABLE 1

| User | Solution Type | Instance Type | Instance Size | Storage |
|---|---|---|---|---|
| A | Private Cloud Enterprise | Compute Optimized | M: 4; XL: 5 | B.S. 2 × 150 TB |
| B | Private Cloud Enterprise | General Purpose | S: 1 | B.P. 1 × 100 TB |
| C | Private Cloud Enterprise | Compute Optimized | S: 4; L: 2; XL: 2 | B.S. 2 × 150 TB |

Table 1 shows user data and prior configuration data for three previously configured cloud solutions.

User A previously configured a proposed cloud solution in which private cloud enterprise was selected as the solution type, compute optimized was selected as the instance type, four medium size and five extra-large size instances of the instance type were selected for instance size, and two 150 terabyte volumes of block standard storage were selected as storage for the proposed cloud solution.

User B previously configured a proposed cloud solution in which private cloud enterprise was selected as the solution type, general purpose was selected as the instance type, one small size instance of the instance type was selected for instance size, and one 100 terabyte volume of block performance storage was selected as storage for the proposed cloud solution.

User C previously configured a proposed cloud solution in which private cloud enterprise was selected as the solution type, compute optimized was selected as the instance type, four small size, two large size, and two extra large size instances of the instance type were selected for instance size, and two 150 terabyte volumes of block standard storage were selected as storage for the proposed cloud solution.

Continuing the scenario, as previously discussed, the presales team member currently using the Cloud Solution Guidance Tool 500 has selected a solution type of Private Cloud Enterprise. After making the selection of solution type, the presales team member selected compute optimized instances for the instance type, and selected four medium size, two large size, and two extra large size instances of the selected instance type. These selections, along with user information related to the presales team member, have been provided to the hybrid recommender system. The hybrid recommender system is executed using the user information, the prior configuration information, and the selections made by the presales team member to generate a recommendation (which may be referred to as user information). The recommendation is provided to the presales team member in element 520 shown in FIG. 5. Specifically, the hybrid recommender tool has determined that users similar to the presales team member, who have selected private cloud enterprise, and compute optimized instances in a variety of sizes (e.g., user A and user C in Table 1) have selected two 150 terabyte block standard storage volumes for the proposed cloud solution. Therefore, element 520 shown in FIG. 5 tells the user, as a recommendation, that "Many users have chosen 2×150 TB Block Standard Storage". The presales team member may choose to follow this recommendation or not, as the presales team member may have reasons to deviate from the recommendation. However, this recommendation may help the user to avoid over or under configuring the proposed cloud solution by providing guidance to the presales team member regarding what type and amount of storage to select for the proposed cloud solution, which may occur, for example, if the presales team member lacks enough experience configuring proposed cloud solutions.

Figure 6:
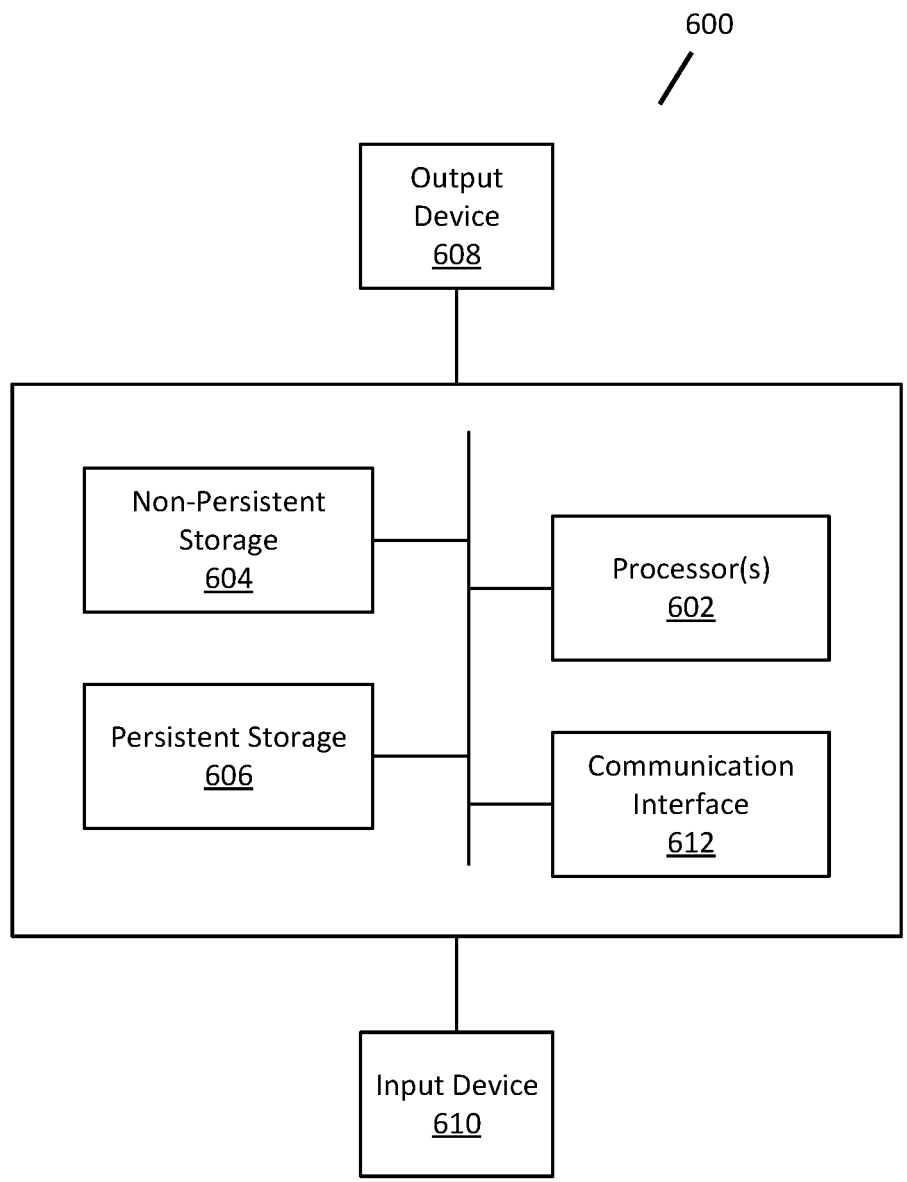
FIG. 6 illustrates a block diagram of a computing device, in accordance with one or more embodiments of this disclosure.

FIG. 6 illustrates a block diagram of a computing device, in accordance with one or more embodiments of this disclosure. As discussed above, embodiments described herein may be implemented using computing devices. For example, the all or any portion of the components shown in FIG. 1 or FIG. 2 (e.g., the guidance tool 102, the hybrid recommender system 200, etc.) may be implemented, at least in part, using one or more computing devices. The computing device 600 may include one or more computer processors 602, non-persistent storage 604 (e.g., volatile memory, such as random access memory (RAM), cache memory, etc.), persistent storage 606 (e.g., a hard disk, an optical drive such as a compact disk (CD) drive or digital versatile disk (DVD) drive, a flash memory, etc.), a communication interface 612 (e.g., Bluetooth interface, infrared interface, network interface, optical interface, etc.), input devices 610, output devices 608, and numerous other elements (not shown) and functionalities. Each of these components is described below.

In one or more embodiments, the computer processor(s) 602 may be an integrated circuit for processing instructions. For example, the computer processor(s) may be one or more cores or micro-cores of a processor. The processor 602 may be a general-purpose processor configured to execute program code included in software executing on the computing device 600. The processor 602 may be a special purpose processor where certain instructions are incorporated into the processor design. Although only one processor 602 is shown in FIG. 6, the computing device 600 may include any number of processors without departing from the scope of embodiments disclosed herein.

The computing device 600 may also include one or more input devices 610, such as a touchscreen, keyboard, mouse, microphone, touchpad, electronic pen, motion sensor, or any other type of input device. The input devices 610 may allow a user to interact with the computing device 600. In one or more embodiments, the computing device 600 may include one or more output devices 608, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 602, non-persistent storage 604, and persistent storage 606. Many different types of computing devices exist, and the aforementioned input and output device(s) may take other forms. In some instances, multimodal systems can allow a user to provide multiple types of input/output to communicate with the computing device 600.

Further, the communication interface 612 may facilitate connecting the computing device 600 to a network (not shown) (e.g., a local area network (LAN), a wide area network (WAN) such as the Internet, mobile network, or any other type of network) and/or to another device, such as another computing device. The communication interface 612 may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 612 may also include one or more Global Navigation Satellite System (GNSS) receivers or transceivers that are used to determine a location of the computing device 600 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

The term computer-readable medium includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

All or any portion of the components of the computing device 600 may be implemented in circuitry. For example, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Example embodiments of this disclosure are summarized here. Other embodiments can also be understood from the entirety of the specification as well as the claims filed herein.

Example 1. In certain embodiments, a method includes receiving, in association with a configuration of a proposed cloud solution, a selection of a first cloud solution aspect made by a user of a guidance tool. The method further includes generating, using a hybrid recommender system, a recommendation for a subsequent selection of a second cloud solution aspect of the configuration of the proposed cloud solution. The hybrid recommender system may include a collaborative filtering system and a content-based filtering system. The hybrid recommender system may generate the recommendation according to information that includes user information including past user behaviors while using the guidance tool, prior configuration information comprising a plurality of previously configured proposed cloud solutions configured by a plurality of other users, and the selection. The method further includes providing the recommendation to the user via a user interface of the guidance tool; receiving the subsequent selection; and generating, by the guidance tool, a proposed cloud solution output based at least in part on the selection and the subsequent selection.

Example 2: The method of Example 1, further including adding the proposed cloud solution output to a guidance tool database to obtain an updated guidance tool database; and re-training the hybrid recommender system using the updated guidance tool database.

Example 3: The method of any one of Examples 1-2, where the selection comprises a solution type and the subsequent selection includes an instance type and an instance size.

Example 4: The method of any one of Examples 1-3, where the selection comprises an instance type and an instance size; the subsequent selection comprises a storage type and a storage size; and the recommendation is related to the storage type and storage size.

Example 5: The method of any one of Examples 1-4, where the subsequent selection is based on the recommendation.

Example 6: The method of any one of Examples 1-5, where the subsequent selection differs from the recommendation.

Example 7: The method of any one of Examples 1-6, where the user interface of the guidance tool comprises a series of visually rendered screens; and at least a portion of the visually rendered screens include one or more elements for accepting proposed cloud solution selections from the user.

Example 8: In certain embodiments, a non-transitory computer-readable medium stores programming for execution by one or more processors, the programming including instructions to: receive, in association with a configuration of a proposed cloud solution, a selection of a first cloud solution aspect made by a user of a guidance tool and generate, using a hybrid recommender system, a recommendation for a subsequent selection of a second cloud solution aspect of the configuration of the proposed cloud solution. In certain embodiments, the hybrid recommender system comprising a collaborative filtering system and a content-based filtering system, where the hybrid recommender system generates the recommendation according to information that includes user information comprising past user behaviors while using the guidance tool, prior configuration information comprising a plurality of previously configured proposed cloud solutions configured by a plurality of other users, and the selection. In certain embodiments, the programming further includes instructions to provide the recommendation to the user via a user interface of the guidance tool; receive the subsequent selection; and generate, by the guidance tool, a proposed cloud solution output based at least in part on the selection and the subsequent selection.

Example 9: The non-transitory computer-readable medium of Example 8, where the programming includes further instructions to add the proposed cloud solution output to a guidance tool database to obtain an updated guidance tool database, and re-train the hybrid recommender system using the updated guidance tool database.

Example 10: The non-transitory computer-readable medium of any one of Examples 8-9, where the selection comprises a solution type and the subsequent selection includes an instance type and an instance size.

Example 11: The non-transitory computer-readable medium of any one of Examples 8-10, where the selection comprises an instance type and an instance size; the subsequent selection comprises a storage type and a storage size; and the recommendation is related to the storage type and storage size.

Example 12: The non-transitory computer-readable medium of any one of Examples 8-11, where the subsequent selection is based on the recommendation.

Example 13: The non-transitory computer-readable medium of any one of Examples 8-12, where the subsequent selection differs from the recommendation.

Example 14: The non-transitory computer-readable medium of any one of Examples 8-14, where the user interface of the guidance tool comprises a series of visually rendered screens; and at least a portion of the visually rendered screens include one or more elements for accepting proposed cloud solution selections from the user.

Example 15: In certain embodiments, a system includes one or more processors; and one or more non-transitory computer-readable media storing programming for execution by the one or more processors. In certain embodiments, the programming includes instructions to receive, in association with a configuration of a proposed cloud solution, a selection of a first cloud solution aspect made by a user of a guidance tool; and generate, using a hybrid recommender system, a recommendation for a subsequent selection of a second cloud solution aspect of the configuration of the proposed cloud solution, the hybrid recommender system comprising a collaborative filtering system and a content-based filtering system. In certain embodiments, the hybrid recommender system generates the recommendation according to information including: user information comprising past user behaviors while using the guidance tool, prior configuration information comprising a plurality of previously configured proposed cloud solutions configured by a plurality of other users, and the selection. In certain embodiments, the programming includes further instructions to provide the recommendation to the user via a user interface of the guidance tool; receive the subsequent selection; and generate a proposed cloud solution output based at least in part on the selection and the subsequent selection.

Example 16: The system of Example 15, wherein the programming further includes instructions to: add the proposed cloud solution output to a guidance tool database to obtain an updated guidance tool database; and re-train the hybrid recommender system using the updated guidance tool database.

Example 17: The system of any one of Example 15-16, wherein the selection comprises a solution type and the subsequent selection includes an instance type and an instance size.

Example 18: The system of any one of Example 15-17, wherein: the selection comprises an instance type and an instance size; the subsequent selection comprises a storage type and a storage size; and the recommendation is related to the storage type and storage size.

Example 19: The system of any one of Example 15-18, wherein the subsequent selection is based on the recommendation Example 20: The system of any one of Example 15-19, wherein the subsequent selection differs from the recommendation.

In the above description, numerous details are set forth as examples of embodiments described herein. It will be understood by those skilled in the art (who also have the benefit of this Detailed Description) that one or more embodiments described herein may be practiced without these specific details, and that numerous variations or modifications may be possible without departing from the scope of the embodiments described herein. Certain details known to those of ordinary skill in the art may be omitted to avoid obscuring the description.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including functional blocks that may include devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but may have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

In the above description of the figures, any component described with regard to a figure, in various embodiments described herein, may be equivalent to one or more same or similarly named and/or numbered components described with regard to any other figure. For brevity, descriptions of these components may not be repeated with regard to each figure. Thus, each and every embodiment of the components of each figure is incorporated by reference and assumed to be optionally present within every other figure having one or more same or similarly named and/or numbered components. Additionally, in accordance with various embodiments described herein, any description of the components of a figure is to be interpreted as an optional embodiment, which may be implemented in addition to, in conjunction with, or in place of the embodiments described with regard to a corresponding one or more same or similarly named and/or numbered component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method, comprising:
   presenting, using a guidance tool, a set of configuration information for a cloud solution at a user interface;
   receiving a selection of first configuration information of the cloud solution, the selection being received from a user device;
   determining, by a content-based filtering system, second configuration information associated with the user device, the content-based filtering system using first information about a given item in relation to the first configuration information and second information related to implicit preferences or explicit preferences over time of the user device;
   ranking the second configuration information based on the second information;
   updating the user interface to provide the ranked second configuration information of the cloud solution, the ranked second configuration information generated using a hybrid recommender system-comprising a collaborative filtering system and the content-based filtering system,
   wherein the hybrid recommender system and the guidance tool are operatively connected, and
   wherein the hybrid recommender system generates the second configuration information according to information comprising:
      user information comprising past user behaviors while using the guidance tool, the past user behaviors comprising implicit feedback while using the guidance tool and explicit feedback associated with a feature of previously configured proposed cloud solutions,
      prior configuration information of the previously configured proposed cloud solutions, and
      the selection of the first configuration information of the cloud solution;
   receiving a subsequent selection associated with the first configuration information and the second configuration information of the cloud solution; and
   generating, by the guidance tool, a proposed cloud solution output based at least in part on the first configuration information and the second configuration information of the cloud solution and the subsequent selection.

2. The method of claim 1, further comprising:
adding the proposed cloud solution output to a guidance tool database to obtain an updated guidance tool database; and
re-training the hybrid recommender system using the updated guidance tool database.

3. The method of claim 1, wherein the selection of the first configuration information comprises a solution type and the subsequent selection includes an instance type and an instance size.

4. The method of claim 1, wherein:
the selection of the first configuration information comprises an instance type and an instance size; and
the subsequent selection comprises a storage type and a storage size.

5. The method of claim 1, further comprising:
generating a recommendation based on the subsequent selection.

6. The method of claim 1, further comprising:
generating a recommendation that differs from the subsequent selection.

7. The method of claim 1, wherein:
the user interface of the guidance tool comprises a series of visually rendered screens; and
at least a portion of the visually rendered screens include one or more elements for accepting proposed cloud solution selections.

8. A non-transitory computer-readable medium storing instructions for execution by one or more processors, the instructions causing the one or more processors to:
present, using a guidance tool, a set of configuration information for a cloud solution at a user interface;
receive a selection of first configuration information of the cloud solution, the selection being received from a user device;
determine, by a content-based filtering system, second configuration information associated with the user device, the content-based filtering system using first information about a given item in relation to the first configuration information and second information related to implicit preferences or explicit preferences over time of the user device;
rank the second configuration information based on the second information;
update the user interface to provide the ranked second configuration information of the cloud solution, the ranked second configuration information generated, using a hybrid recommender system-comprising a collaborative filtering system and the content-based filtering system,
wherein the hybrid recommender system and the guidance tool are operatively connected, and
wherein the hybrid recommender system generates the second configuration information according to information comprising:
user information comprising past user behaviors while using the guidance tool, the past user behaviors comprising implicit feedback while using the guidance tool and explicit feedback associated with a feature of previously configured proposed cloud solutions,
prior configuration information of the previously configured proposed cloud solutions, and
the selection of the first configuration information of the cloud solution;
receive a subsequent selection associated with the first configuration information and the second configuration information of the cloud solution; and
generate, by the guidance tool, a proposed cloud solution output based at least in part on the first configuration information and the second configuration information of the cloud solution and the subsequent selection.

9. The non-transitory computer-readable medium of claim 8, wherein the instructions further causing the one or more processors to:
add the proposed cloud solution output to a guidance tool database to obtain an updated guidance tool database; and
re-train the hybrid recommender system using the updated guidance tool database.

10. The non-transitory computer-readable medium of claim 8, wherein the selection of the first configuration information comprises a solution type and the subsequent selection includes an instance type and an instance size.

11. The non-transitory computer-readable medium of claim 8, wherein:
the selection of the first configuration information comprises an instance type and an instance size;
the subsequent selection comprises a storage type and a storage size.

12. The non-transitory computer-readable medium of claim 8, wherein the instructions further cause the one or more processors to:
generate a recommendation based on the subsequent selection.

13. The non-transitory computer-readable medium of claim 8, wherein the instructions further cause the one or more processors to:
generate a recommendation that differs from the subsequent selection.

14. The non-transitory computer-readable medium of claim 8, wherein:
the user interface of the guidance tool comprises a series of visually rendered screens; and
at least a portion of the visually rendered screens include one or more elements for accepting proposed cloud solution selections.

15. A system, comprising:
one or more processors; and
one or more non-transitory computer-readable media storing instructions for execution by the one or more processors, the instructions causing the one or more processors to:
present, using a guidance tool, a set of configuration information for a cloud solution at a user interface;
receive a selection of first configuration information of the cloud solution, the selection being received from a user device;
determining, by a content-based filtering system, second configuration information associated with the user device, the content-based filtering system using first information about a given item in relation to the first configuration information and second information related to implicit preferences or explicit preferences over time of the user device;
ranking the second configuration information based on the second information;
update the user interface to provide the ranked second configuration information of the cloud solution, the ranked second configuration information generated, using a hybrid recommender system comprising a collaborative filtering system and the content-based filtering system, wherein the hybrid recommender system and the guidance tool are operatively connected, and wherein the hybrid recommender system generates the second configuration information according to information comprising:

user information comprising past user behaviors while using the guidance tool, the past user behaviors comprising implicit feedback while using the guidance tool and explicit feedback associated with a feature of previously configured proposed cloud solutions, prior configuration information of the previously configured proposed cloud solutions, and the selection of the first configuration information of the cloud solution;

receive a subsequent selection associated with the first configuration information and the second configuration information of the cloud solution; and generate a proposed cloud solution output based at least in part on the first configuration information and the second configuration information of the cloud solution and the subsequent selection.

16. The system of claim 15, wherein the instructions further causing the one or more processors to:

add the proposed cloud solution output to a guidance tool database to obtain an updated guidance tool database; and re-train the hybrid recommender system using the updated guidance tool database.

17. The system of claim 15, wherein the selection of the first configuration information comprises a solution type and the subsequent selection includes an instance type and an instance size.

18. The system of claim 15, wherein:

the selection of the first configuration information comprises an instance type and an instance size;

the subsequent selection comprises a storage type and a storage size.

19. The system of claim 15, wherein the instructions further causing the one or more processors to:

generate a recommendation based on the subsequent selection.

20. The system of claim 15, wherein the instructions further causing the one or more processors to:

generate a recommendation that differs from the subsequent selection.

21. The method of claim 1, further comprising:

training the collaborative filtering system using user data and prior configuration data from a guidance tool database to generate a matrix of users and proposed cloud solution aspects.

22. The method of claim 21, further comprising:

organizing the matrix of users and the proposed cloud solution aspects for preferences of the user; and training the content-based filtering system using the organized matrix.

* * * * *